US007641827B2

(12) United States Patent
Menzel et al.

(10) Patent No.: US 7,641,827 B2
(45) Date of Patent: Jan. 5, 2010

(54) METHOD AND DEVICE FOR PRESSING A FORMED PART WITH A TRANSVERSE PUNCH

(75) Inventors: Roland Menzel, Kochel am See (DE); Michael-Thomas Silbermann, Bichl (DE)

(73) Assignee: Dorst Technology GmbH & Co. KG, Kochel Am See (DE)

( * ) Notice: Subject to any disclaimer, the term of this patent is extended or adjusted under 35 U.S.C. 154(b) by 0 days.

(21) Appl. No.: 12/031,468

(22) Filed: Feb. 14, 2008

(65) Prior Publication Data

US 2008/0196604 A1 Aug. 21, 2008

Related U.S. Application Data

(63) Continuation of application No. PCT/DE2006/001423, filed on Aug. 14, 2006.

(51) Int. Cl.
*B29C 43/02* (2006.01)

(52) U.S. Cl. ......................... 264/119; 264/120; 419/66; 425/78; 425/344; 425/352

(58) Field of Classification Search ....................... None
See application file for complete search history.

(56) References Cited

U.S. PATENT DOCUMENTS

| | | | | |
|---|---|---|---|---|
| 1,449,095 | A | 3/1923 | Gremaud et al. | |
| 5,378,416 | A | 1/1995 | Kishi et al. | |
| 7,318,715 | B2 * | 1/2008 | Markeli | 425/78 |

FOREIGN PATENT DOCUMENTS

| | | |
|---|---|---|
| DE | 1 019 889 | 11/1957 |

(Continued)

OTHER PUBLICATIONS

Search Report for German application No. DE 10 2005 038 915.5, mailed Jun. 9, 2006.

(Continued)

*Primary Examiner*—Mary Lynn F Theisen
(74) *Attorney, Agent, or Firm*—Knobbe Martens Olson & Bear LLP

(57) ABSTRACT

The invention relates to a method for pressing a formed part, in which a ceramic and/or metallic material to be pressed, in particular powdery and/or granulated material (3) is being filled into the die cavity (2) of a die (1), in an axis of compaction (X) with at least one pressing punch (4, 5) the material (3) is being pressed, and in a direction, with a component of movement perpendicular to the first axis of compaction (X), a transverse punch (6) is being moved into the material (3) in a transverse axis (QX), with the movement of the transverse punch (6) being carried out during and/or after pressing of the material (3) in the axis of compaction (X), in particular during and/or after beginning of the compaction operation of the material (3). In particular there is carried out according to the method the actuation of pressing punches in the axis of compaction in such a way, that there act onto the transverse punch in the direction of the axis of compaction on both sides approximately equal forces. For reducing the installation space required at the side of the die, while nevertheless providing forces, which are sufficient for the transverse punch, it is of advantage to use an eccentric drive mechanism.

19 Claims, 2 Drawing Sheets

FOREIGN PATENT DOCUMENTS

| | | | | |
|---|---|---|---|---|
| DE | 19508952 | A1 | * | 9/1996 |
| DE | 201 15 860 | U1 | | 12/2001 |
| GB | 713340 | | | 8/1954 |
| JP | 7-88698 | | * | 4/1995 |
| JP | 11-300496 | | * | 11/1999 |

OTHER PUBLICATIONS

International Search Report for International application No. PCT/DE2006/001423, mailed Dec. 18, 2006.

* cited by examiner

METHOD AND DEVICE FOR PRESSING A FORMED PART WITH A TRANSVERSE PUNCH

CROSS REFERENCE TO RELATED APPLICATIONS

This application is a continuation of International Application PCT/DE2006/001423, filed on Aug. 14, 2006. The PCT/DE2006/001423 application is hereby incorporated by reference in its entirety.

BACKGROUND OF THE INVENTION

1. Field of the Invention

The invention relates to a method and a device for pressing a formed part, in which a ceramic and/or metallic material to be pressed is being filled into a die cavity of a die, in which the material is being compacted and pressed in an axis of compaction with at least one pressing punch, and in which, in a direction with a component of movement in a transverse axis perpendicular to the axis of compaction, a transverse punch is being moved into the material.

2. Description of the Related Art

A method and a device for pressing a formed part using a transverse punch are known from DE 195 08 952 C2. In this, a powdery material filled into a cavity of a die is pressed in a first axis of compaction with at least one pressing punch and is compacted to a formed part. After filling of the die cavity with powder material, for the moment still in bulk condition, or if applicable also during or after one or several partial pressing operations, during which the material is not yet being compacted, transverse punches are moved in a transverse axis in a direction approximately towards the centre of the die, and thus displace the not compacted powder from recesses later achieved in the formed part. The transverse axis in this case is in a plane perpendicular to the first compaction axis of the pressing operation. During the subsequent compaction operation, the transverse punches are located in the end position reached, while being supported also by lower punches and additional supporting elements of the pressing tool, so that they are protected against rupture caused by shearing forces acting in the first compaction axis. Movement of the transverse punches is thus carried out in a phase of the pressing process during which powder transfer is still possible.

For movement of the transverse punches, a complex drive arrangement is proposed inside a plate at the side of the die, which laterally requires a very large space for mounting. Such a drive comprises in particular segmental slides and segmental pistons of complex design and/or a worm gear. Use of such arrangements, however, due to the dimensions required, is impossible—in case of relatively high forces required—in ordinary press frames, in which the die and the respective platens and punch arrangements are accommodated.

SUMMARY OF THE INVENTION

The object of the invention is to propose a method and a device for pressing a formed part using a transverse punch, making possible a more universal use of the transverse punch. In particular, there is to be made possible the installation in ordinary press frames, where at the side of the die there is only limited space for mounting a transverse punch drive.

The object is accomplished by a method for pressing a formed part, in which a ceramic and/or metallic material to be pressed, in particular powdery and/or granulated material, is being filled into a die cavity of a die, in which the material is being compacted and pressed in an axis of compaction with at least one pressing punch, and in which, in a direction with a component of movement in a transverse axis perpendicular to the axis of compaction, a transverse punch is being moved into the material, with the movement of the transverse punch being carried out during and/or after pressing of the material in the axis of compaction, in particular during and/or after beginning of the operation of compaction of the material, and in which an eccentric drive mechanism is used for pressing in the transverse axis.

Further, the object is accomplished by a device for pressing a formed part from a ceramic and/or metallic material to be pressed, in particular powdery and/or granulated material, with a die with a die cavity for receiving the material, with at least one pressing punch, moveable for pressing the material in a compaction axis, with a transverse punch, moveable into the material for forming and/or pressing of the formed part in a direction with a component of movement perpendicular to the axis of compaction in a transverse axis, and with a transverse punch drive unit for the transverse punch, with the transverse punch drive unit comprising an eccentric drive mechanism for driving the transverse punch.

According to the method and according to the device, movement of the transverse punch is carried out during and/or after actual pressing of the material, i.e. in particular after powder flow, in the axis of compaction, with the forces being provided by means of a transverse punch drive unit by an eccentric drive mechanism for driving the transverse punch. As compared to conventional driving devices, for example hydraulic pistons or worm gears, an eccentric drive mechanism requires surprisingly small space for mounting at the side of the die.

Preference is given in particular to a method, in which the transverse punch is being struck against and driven into the material for embossing it in the transverse axis, for additional forming of the material being in advance finally compacted, in particular completely pressed, in the axis of compaction.

Preference is given in particular to a method, in which the transverse punch, during pressing of the material, is being moved into it, with at least one pressing punch being arranged in the axis of compaction on each side of the transverse punch, and with the material being pressed in the axis of compaction in a way that forces equal within a tolerance act onto the transverse punch from both sides in the direction of the axis of compaction. Preference is given in particular to a method, in which the tolerance corresponds to nearly zero, in particular to zero.

Preference is given in particular to a device, in which an eccentric wheel moves the transverse punch by means of an eccentric rod assembly.

Preference is given in particular to a device, in which the transverse punch is being moved linearly by an eccentric wheel-locating device, and in which the eccentric wheel-locating device pivotably locates an arrangement of an outer eccentric wheel with an eccentric wheel pivotably located in it.

Preference is given in particular to a device, in which the eccentric wheel can be driven by a drive shaft, with the drive shaft being arranged essentially parallel to the axis of compaction of the at least one pressing punch.

Preference is given in particular to a device, in which the eccentric drive mechanism is designed to strike the transverse punch against or into the formed part, in particular to strike the transverse punch against or into the formed part in the way of an embossing method.

Preference is given in particular to a device with an electric motor with rotary encoder for determination of position for driving the eccentric drive mechanism.

Preference is given in particular to a device with a control unit for controlling pressing of the material and for controlling the eccentric drive mechanism, with the control unit being designed to actuate punches arranged in the axis of compaction and on both sides of the transverse punch, subjecting to pressing force and in such a way, that there act onto the transverse punch from both sides, in the direction of the compaction axis, forces equal within a tolerance. Preference is given in particular to a device, in which the tolerance corresponds to nearly zero, in particular to zero.

Preference is given in particular to a device with the transverse punch being exchangeable attached to the eccentric drive mechanism by a transverse punch coupling.

Preference is given in particular to a method and/or a device, with the axis of compaction of the at least one pressing punch constituting a main pressing axis for material compaction proper.

Preference is given in particular to a method and/or a device, with the pressing punch or pressing punches being moveable in the axis of compaction by a hydraulic drive of the press.

Preference is given in particular to a method and/or a device, with the transverse punch being moveably arranged in a plane essentially perpendicular to the axis of compaction of the at least one pressing punch.

Of advantage is the configuration of one-piece punches, which can be attached to the eccentric drive mechanism, as such punches can be made available for a large variety of punch structures and can be exchanged in a simple way. In addition, the punches, which in such an arrangement constitute a wearing part, can be easily exchanged. Preferably such an arrangement permits support of the eccentric drive mechanism at the rear on the housing, or in a die-locating device for locating the die.

BRIEF DESCRIPTION OF THE DRAWINGS

An exemplary embodiment of a version is being explained below on the basis of the drawing. There is shown in.

DETAILED DESCRIPTION OF THE PREFERRED EMBODIMENT

Figure 1:
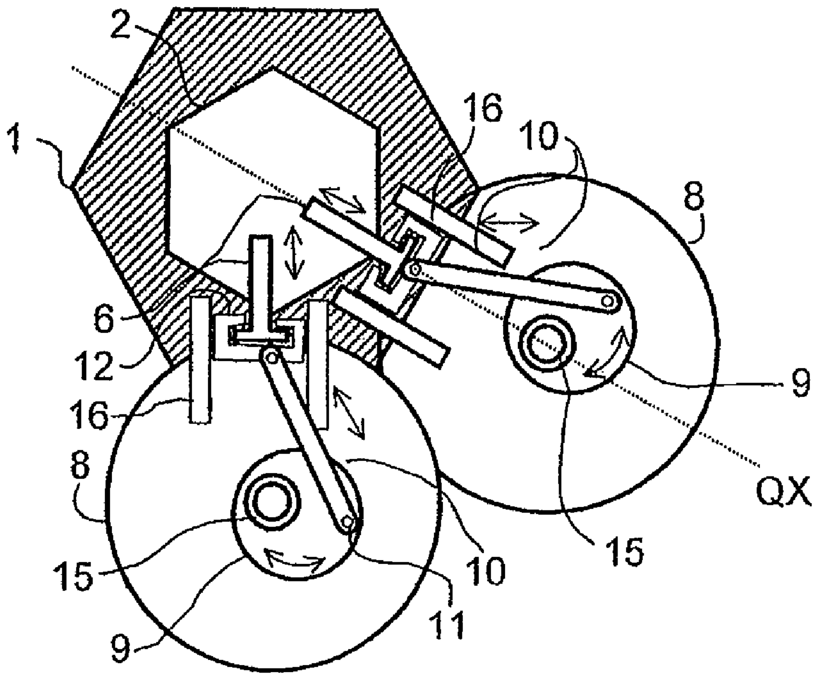
FIG. 1 is a top view of components of an arrangement of a press elucidating the structure of a transverse punch drive.
Figure 2:
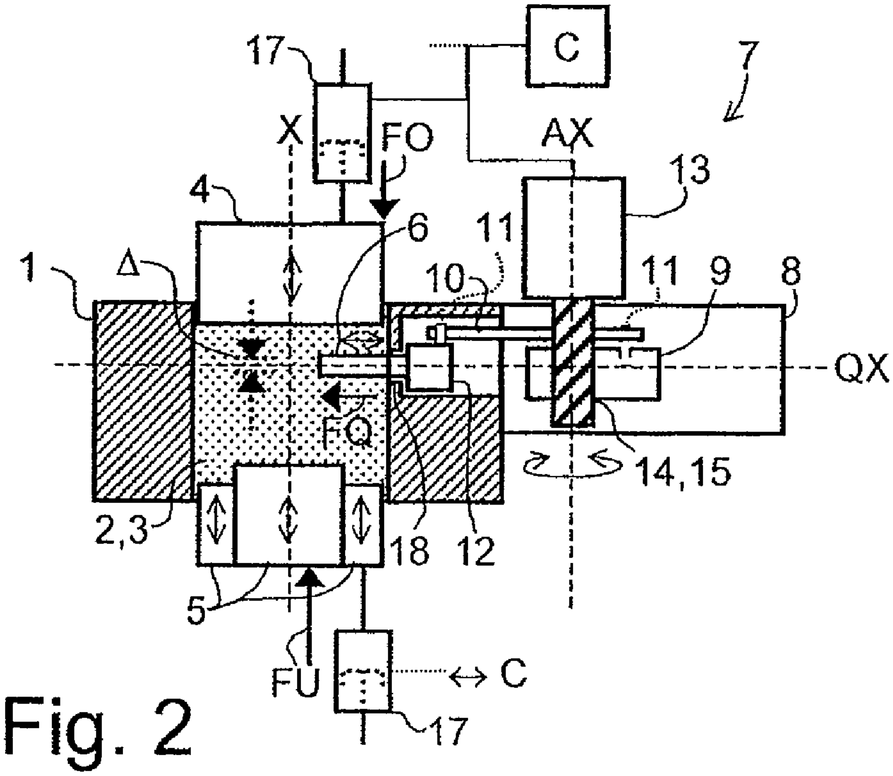
FIG. 2 is a partial sectional side view of such an arrangement.

As can be seen from FIG. 1 and FIG. 2, there serves for pressing a formed part from a ceramic and/or metallic material 3 a die 1 with a die cavity 2 for filling the material 3 to be pressed, as well as an arrangement of punches 4, 5, 6 for compacting and pressing the material 3 filled into the die cavity 2. The material is, in particular, a powdery and/or granulated material.

At least one, preferably at least two opposite punches 4, 5, or even a plurality of punches 5 adjacent to each other, are moveably arranged for pressing the material 3 in an axis of compaction X, with the axis of compaction X preferably corresponding to the central axis of the whole arrangement. For displacing the punches 4, 5, there preferably serve hydraulic forces applied by hydraulic cylinders 17 to the rear side of the punches 4, 5. Alternatively there can, of course, also be used mechanical or electric motor driven actuators for moving the punches 4, 5 and for pressing the material 3 to compacted condition. By means of the hydraulic cylinders 17 and the punches 4, 5, the material 3 to be pressed is pressed applying an upper punch force FO and at least one lower punch force FU, respectively.

In addition there is arranged—as seen from the axis of compaction X—at the side of the die cavity 2 in the wall of the die 1 and/or in a housing 8 adjacent to it, a transverse punch 6, which is moveable laterally into the die cavity 2 in a transverse axis QX. The transverse punch 6 serves for forming lateral indentations in the formed part to be pressed in the die cavity 2. For subjecting the transverse punch 6 to a transverse punch force FQ, a transverse punch drive, in particular an eccentric drive mechanism 7, is used.

The eccentric drive mechanism 7 is housed completely or partly in the wall of the die and/or in the housing at the side of the die cavity 2, depending on the size of the wall of the die 1 and/or the housing 8 adjacent to it. The eccentric drive mechanism 7 consists of an eccentric wheel 9, the outside circumference of which is rotated eccentrically around a driving axis AX of a drive or motor 13. For precise actuation, the drive 13 is designed in particular as an electric motor with rotary encoder. Connection of a drive shaft 14 of the motor 13 to the eccentric wheel 9 is carried out in the usual way by means of a corresponding internal thread 15 of the eccentric wheel 9. Adjacent to the outside circumference of the eccentric wheel 9, there is pivotably located by means of a bolt 11 a rod assembly element of an eccentric rod assembly 10. The other end of the eccentric rod is pivotably located by means of another bolt 11 at the transverse punch 6 or preferably at a transverse punch coupling 12. In the preferred design, the transverse punch 6 shows in the top view a T-shape contour, with the crossbar being inserted in the C-shape formed transverse punch coupling 12. Such an arrangement, with such a transverse punch coupling 12 or a transverse punch coupling 12 of alternative design, allows quick exchange of a transverse punch 6 against another transverse punch 6. Thus worn transverse punches 6 can be replaced or can be exchanged, in case of a different shape of the face of the transverse punch for embossing a different structure. Lateral guides 16 and/or a corresponding opening for passage 18 in the wall of the die serve for guiding the transverse punch 6 and/or the transverse punch coupling 12 together with the transverse punch 6.

Preferably there can be arranged a plurality of such transverse drives with transverse punches 6 around the compaction axis X, respectively around the die cavity 2 and the die 1, in order to press or emboss, by means of a plurality of such transverse punches 6, in the formed part to be produced a corresponding plurality of lateral indentations.

By means of a control unit C, the whole arrangement is controlled, in particular the upper punch force FO and the lower punch force FU, as well as the transverse punch force FQ of the various punches 4, 5, 6 acting onto the material 3 to be pressed. In addition to a corresponding curve of the force of the individual punches, there is effected also coordination of timing taking into consideration the respective instantaneous condition of compaction of the material 3 to be pressed. Due to the use of an eccentric drive mechanism 7 for the movement of the transverse punch 6, an electric motor of 20 W driving power is already sufficient to exert with the face of the transverse punch 6 a high pressing force—in particular a pressing force of approx. 10 kN—onto the material 3, respectively onto the formed part produced or being produced. Hereby use is being made of in particular of the corresponding lever action of such an eccentric drive mechanism 7. The pressing force, which the eccentric drive mechanism 7 can make available, is sufficient, in particular, to enable forming with the transverse punch 6 not only before but also during actual compaction of the material 3, i.e. after a possible powder transfer, or after final compaction of the material 3. In case of a formed part already nearly compacted, or a compacted formed part, forming is effected by embossing structures into the respective lateral wall of the formed part, respectively into the formed part. In this case, in actual fact, the punches 4, 5 in the axis of compaction X, in a way serve as die for the movement and forming effort by the transverse punch 6.

For an increase of the pressing force, it is possible to install as an option a transmission between the actual motor or drive 13 and the drive shaft 14, which engages in the internal thread 15 to 16 of the eccentric wheel 9. Furthermore it is of advantage that, in case of an arrangement of a plurality of such transverse punches and transverse punch drives, the individual transverse punches 6, respectively their pressing surfaces, can be driven independently of each other and by closed-loop control.

An advantageous design is the space-saving arrangement using the eccentric wheel 9 and the drive 13 in the driving axis AX, which is arranged parallel or essentially parallel to the axis of compaction X. This makes possible a design requiring only small place in lateral direction from the die, so that the die 1, with the eccentric drive mechanism 7 attached, can be used in arrangements of presses and press frames, even if the lateral space available for installation is only small. In particular this makes possible a modular design regarding exchangeability of the individual punches, corresponding dies 1 with openings for passage 18 for transverse punches 6 of any corresponding shape, and housings 8 for transverse punch drives attachable at the side.

If it is desired to have the transverse punch 6 moveable not in a plane perpendicular to the axis of compaction X but in a plane at an angle to the axis of compaction X, it is possible to provide as an option either a corresponding transmission ratio of the eccentric drive mechanism or a corresponding tilting of the driving axis AX. In case of only small place available for mounting and a large-size punch for pressing in or parallel to the axis of compaction X, such a transverse punch and transverse punch drive can in principle also be incorporated in such a punch 4.

Of special advantage is purposeful control of the upper punch force FO and of the lower punch force FU of one or a plurality of upper punches 4 and lower punches 5 by means of a control unit C in a way that—in the area of the transverse axis QX, respectively in the area of the transverse punch 6 being moved into the die cavity 2—there is created an area of neutral force regarding the orientation of the forces acting in the axis of compaction X onto the lateral transverse punch 6. In particular, the forces acting in such manner laterally onto the transverse punch 6 in the axis of compaction X are maintained within a tolerance Δ, so that, in case of a transverse punch 6 projecting deeply into the die cavity 2, there do not act during or before the compaction phase any excessively high lateral forces onto the transverse punch 6, which would shear it off, bend it or jam it in the formed opening. This makes it possible also to use the transverse punch 6 in an off-centre area of the space of the die cavity 2 formed between the punches 4, 5 in the axis of compaction X.

Figure 3:
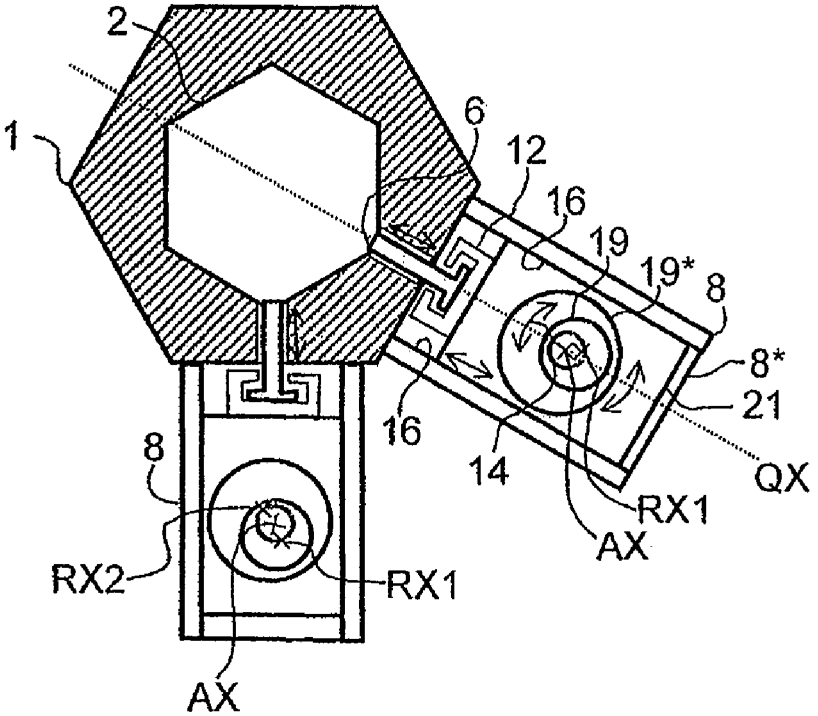
FIG. 3 is a top view of an alternative embodiment as partial sectional view.
Figure 4:
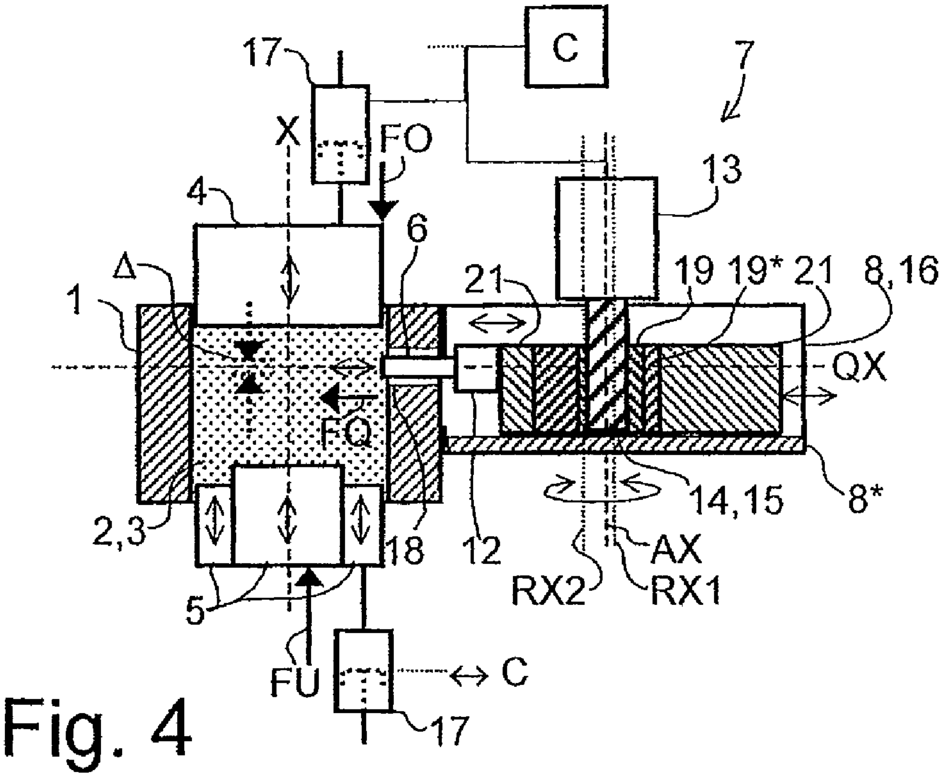
FIG. 4 is a partial sectional side view of the alternative embodiment.

Based on the FIGS. 3 and 4, an alternative embodiment is being explained, with a description being given essentially only for those components and their function, which are different to those of the first embodiment, in order to avoid repetitions. Identical reference symbols in the FIGS. 3 and 4 signify identical components or components of identical function as compared to the first embodiment.

The housing 8 for accommodating the eccentric drive mechanism 7 proper is of essentially cuboid-shape structure, with two lateral walls 16 for lateral guidance of a preferably plate-shape eccentric wheel locating device 21. The eccentric wheel locating device 21 is moveable in linear direction in the transverse axis QX between the lateral walls 16 and on a bottom surface 8* of the housing 8. On the side of the face of the eccentric wheel locating device 21 there is fixed a transverse punch coupling 12 for pivotably locating a transverse punch 6. The transverse punch coupling 12 is being moved together with the eccentric wheel-locating device 21 in the transverse axis QX.

The eccentric wheel-locating device 21 has an essentially cylindrical locating device for pivotably locating therein an external eccentric wheel 19*. The eccentric wheel 19* has again an essentially cylindrical locating device for an inner eccentric wheel 19. The inner eccentric wheel 19 has a cylindrical locating device for locating therein a drive shaft 14 of a drive 13. One driving axis AX of the drive 13 and of the drive shaft 14 is slightly offset in relation to an axis of rotation RX1 and slightly offset in relation to the driving axis AX. An axis of rotation RX2 of the outer eccentric wheel 19* is offset in relation to the axis of rotation RX1 of the inner eccentric wheel 19 and in relation to the driving axis AX. The distance of the axis of rotation RX2 of the outer eccentric wheel 19* to the driving axis AX is larger than the distance of the axis of rotation RX1 of the inner eccentric wheel 19 to the driving axis AX. Both axes of rotation RX1, RX2 and the driving axis AX are preferably arranged in offset position and parallel to the axis of compaction X.

Such an arrangement of an eccentric drive mechanism is favourable in particular in case of only small travels of feed motion of the transverse punch 6 in an embossing way for forming an indentation in the outside circumference of a formed part. Depending on the dimensions of such an eccentric drive mechanism 7, there can be embossed preferably indentations of a depth in the range of up to several millimeters in the outside circumference of the formed part. In principle, however, there are realizable also larger travels of feed motion by correspondingly larger dimensions of the eccentric drive mechanism.

What is claimed is:

1. A method for pressing a formed part, comprising:

filling a ceramic and/or metallic material to be pressed into a die cavity of a die, compacting and pressing the material in an axis of compaction with at least one pressing punch, and moving a transverse punch into the material in a direction with a component of movement in a transverse axis (QX) perpendicular to the axis of compaction, wherein the movement of the transverse punch is carried out during and/or after beginning pressing of the material in the axis of compaction, and in which an eccentric drive mechanism is used for pressing in the transverse axis.

2. Method according to claim 1, in which the transverse punch is being struck against and driven into the material for embossing it in the transverse axis for additional forming of the material being finally compacted in the axis of compaction.

3. Method according to claim 1, with the axis of compaction of the at least one pressing punch constituting a main pressing axis for material compaction proper.

4. Method according to claim 1, with the pressing punch or punches being moveable in the axis of compaction by means of a hydraulic drive of the press.

5. Method according to claim 1, with the transverse punch being moveably arranged and moved in a plane essentially perpendicular to the axis of compaction of the at least one pressing punch.

6. A device for pressing a formed part from a ceramic and/or metallic material to be pressed, comprising a die with a die cavity for receiving the material, at least one pressing punch, moveable for pressing the material in a compaction axis, a transverse punch, moveable into the material for forming and/or pressing of the formed part in a direction with a component of movement perpendicular to the axis of compaction in a transverse axis, and a transverse punch drive unit for the transverse punch, wherein the transverse punch drive unit comprises an eccentric drive mechanism for driving the transverse punch.

7. Device according to claim 6, with an eccentric wheel displacing the transverse punch by means of an eccentric rod assembly.

8. Device according to claim 7, in which the eccentric wheel can be driven by a drive shaft, with the drive shaft being arranged essentially parallel to the axis of compaction of the at least one pressing punch.

9. Device according to claim 6, with the transverse punch being moved linearly by an eccentric wheel locating device, and with the eccentric wheel locating device pivotably locating an arrangement of an outer eccentric wheel with an eccentric wheel pivotably located in it.

10. Device according to claim 9, in which the eccentric wheel can be driven by a drive shaft, with the drive shaft being arranged essentially parallel to the axis of compaction of the at least one pressing punch.

11. Device according to claim 6, with the eccentric drive mechanism being designed to strike the transverse punch against, respectively into, the formed part.

12. Device according to claim 6, with an electric motor with rotary encoder for determination of position for driving the eccentric drive mechanism.

13. Device according to claim 6, with the transverse punch being exchangeable and attached to the eccentric drive mechanism by a transverse punch coupling.

14. Device according to claim 6, with the axis of compaction of the at least one pressing punch constituting a main pressing axis for material compaction proper.

15. Device according to claim 6, with the pressing punch or punches being moveably arranged in the axis of compaction by means of a hydraulic drive of the press.

16. Device according to claim 6, with the transverse punch being moveably arranged in a plane essentially perpendicular to the axis of compaction of the at least one pressing punch.

17. Method according to claim 1, wherein the material is powdery and/or granulated.

18. Method according to claim 2, wherein the material is completely pressed.

19. Device according to claim 11, wherein the eccentric drive mechanism is designed to strike by way of an embossing method against, respectively into, the formed part.

* * * * *

UNITED STATES PATENT AND TRADEMARK OFFICE

CERTIFICATE OF CORRECTION

PATENT NO. : 7,641,827 B2
APPLICATION NO. : 12/031468
DATED : January 5, 2010
INVENTOR(S) : Roland Menzel et al.

It is certified that error appears in the above-identified patent and that said Letters Patent is hereby corrected as shown below:

On the Title pg., please add a section entitled Item (30) Foreign Application Priority Data
--08/17/2005 GERMANY......... -- 10 2005 038 915.5 --

Signed and Sealed this
Tenth Day of July, 2012

David J. Kappos
*Director of the United States Patent and Trademark Office*